J. W. LEONARD.
SPRING TIRE FOR VEHICLE WHEELS.
APPLICATION FILED OCT. 18, 1912.
1,090,996.
Patented Mar. 24, 1914.
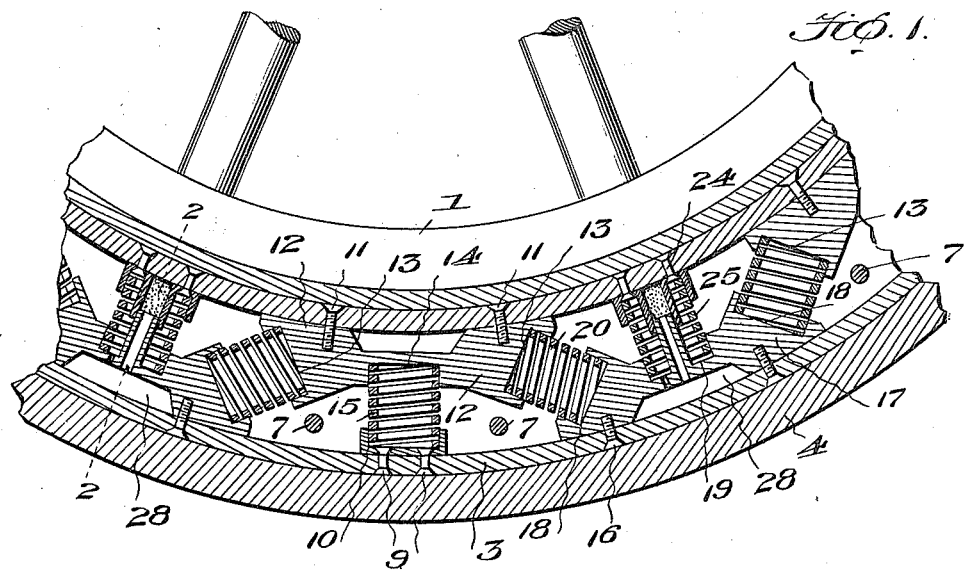
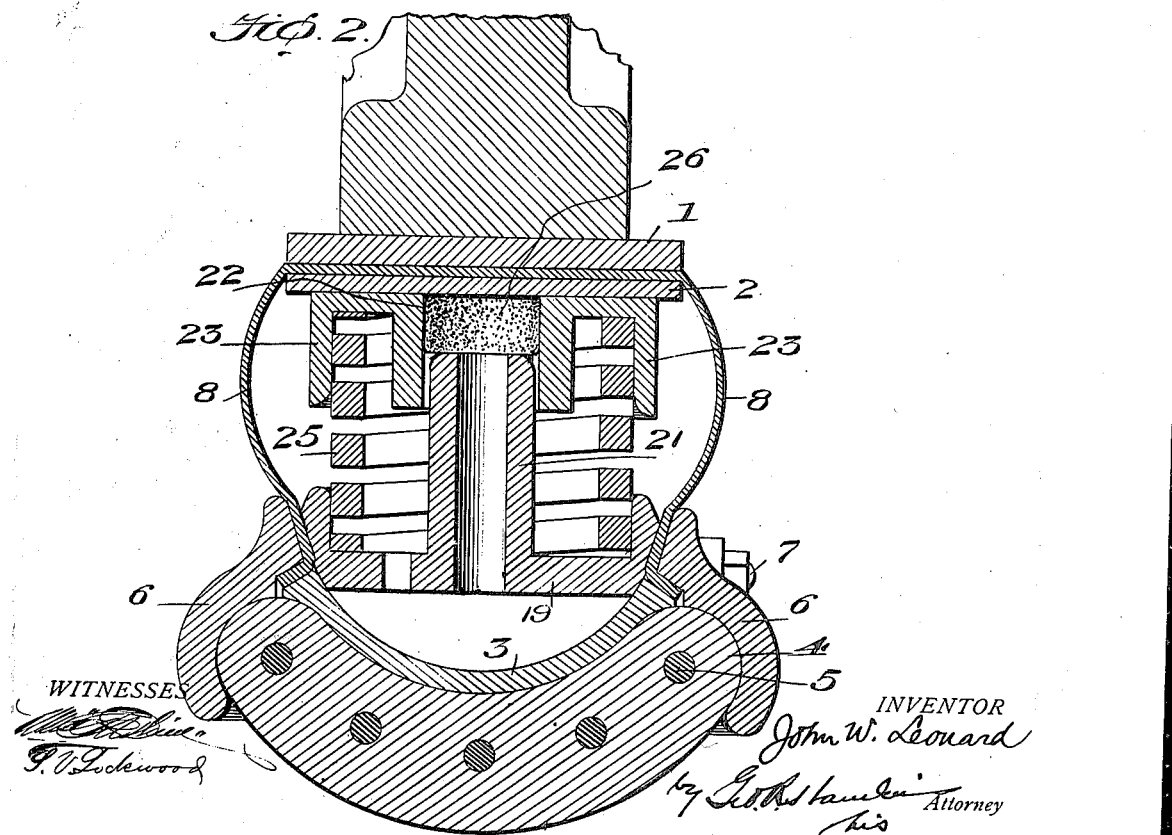

ively, metallic tire or rim 2.
UNITED STATES PATENT OFFICE.

JOHN W. LEONARD, OF NEWBURGH, NEW YORK.

SPRING-TIRE FOR VEHICLE-WHEELS.

1,090,996.

Specification of Letters Patent. Patented Mar. 24, 1914.

Application filed October 18, 1912. Serial No. 726,434.

*To all whom it may concern:*

Be it known that I, JOHN W. LEONARD, a citizen of the United States, residing at Newburgh, county of Orange, and State of New York, have invented certain new and useful Improvements in Spring-Tires for Vehicle-Wheels, of which the following is a specification.

This invention relates to spring tires for vehicle wheels.

My object is to provide an improved spring tire of the type employing coiled springs interposed between the wheel rim or felly proper and the floated tire rim movable in relation thereto, and to this end it provides, first, an improved arrangement of the springs whereby, in addition to affording a spring support for the wheel, the impact of the wheel with any object is cushioned, regardless of the direction in which it is moving, and a certain adaptability to yield sidewise, as when turning a curve, is permitted; second, the invention provides a novel construction and arrangement of spring abutment blocks or members; third, novel telescopic guides interposed between the wheel rim and the tire rim, whereby the tire and tire rim are prevented from having undue lateral displacement as when the wheel is turning a curve.

The invention is set forth fully hereinafter and the improved and novel features thereof are recited in the appended claim.

In the accompanying drawings: Figure 1 is a longitudinal section through a portion of a spring tire made according to the present invention; and Fig. 2, an enlarged cross section on line 2—2, Fig. 1.

The wheel 1 is provided with a preferably metallic tire or rim 2.

At 3 is shown a tire rim which carries a suitable tire 4, preferably of rubber and preferably provided with embedded, circumferential, reinforcing wires 5. Circular or sectional tire clamps 6 are held to the rim 3 and tire 4 by clamp bolts 7 affording means for taking the tire apart and, further, for securing the parts thereof together. A leather or other suitable fabric 8 is clamped between the wheel felly 1 and the rim or tire 2, the end parts thereof being secured between the clamp plates 6 and the rim 3. This fabric casing 8 extends entirely around the tire and houses the springs and other parts interposed between the wheel and the rim 3 and, being flexible, the casing 8 is adapted for extension or compression as the rim 3 and tire 4 move inwardly or outwardly in relation to the wheel.

Secured to the rim 3 by any suitable means, such as rivets 9, are a plurality of cups 10 arranged at intervals around the wheel. Secured by any suitable fastening, such as screws 11, to the tire 2 and arranged opposite the cups 10, are the abutment blocks or castings 12 which are provided with cups 13 at their ends and with an intermediate cup 14. Seated in the cups 10 and 14 are springs 15, there being provided a number of these springs at intervals around the wheel.

Suitably secured to the rim 3, as by screws 16, are abutment blocks or castings 17 whose general form is substantially that of the abutment blocks 12 and which have cups 18 at their end parts disposed opposite the cups 13 and central cups 19. Springs 20 have their ends received in the cups 13 and 18.

Extending centrally of the cups 19 are hollow or tubular plungers 21 which are loosely received in cylinders 22 disposed centrally of cups 23, the latter being suitably connected to the tire 2 by rivets or other fastenings 24. The fit of the plungers 21 in cylinders 22 is sufficiently loose to permit a certain amount of relative lateral play sufficient to compensate for all movement of the rim 3 in relation to the wheel. Springs 25 are seated in the cups 19 and 23 and surround the plungers 21 and cylinders 22. Preferably, rubber or elastic cushions 26 are located in the cylinders 22. The springs 15 and 25, and also the cushions 26 cushion the weight placed upon the wheel; the springs 20 also cushion the weight placed upon the wheel, but in addition thereto they are, due to their inclined position, adapted to cushion the shock or impact on the tire when an obstacle is encountered, whether the wheel be going forward or backward. The plungers 21 and cylinders 22 constitute guiding means to resist too great lateral inclination or displacement of the tire 4 in relation to the wheel, but at the same time the fact that the springs 15 and 20 are free, permits considerable relative lateral displacement so that a suitable cushioning action is had as the wheel turns a curve. The cups anchor the springs and prevent them from becoming displaced. The arrangement of springs and abutment blocks shown in Fig. 1 is continued in the order disclosed in Fig. 1 completely around the wheel.

Having thus described my invention, what I claim as new and desire to secure by Letters Patent, is:—

In a spring tire for vehicle wheels, the combination with the wheel proper and a tire movable in relation thereto, of abutment blocks carried by the wheel and the tire and arranged in alternation, said abutment blocks being provided with inclined cups at their end parts and a cup at their center part, inclined coil springs whose ends are seated in and retained by the cups at the end parts of the alternating abutment blocks on the wheel and tire, respectively, cups carried by the tire at points opposite the cups at the centers of the abutment blocks, and coil springs seated in said cups and in the cups at the centers of the abutment blocks, said springs being arranged radially of the wheel.

In testimony whereof, I hereunto affix my signature in presence of two witnesses.

JOHN W. LEONARD.

Witnesses:
A. W. THOMPSON,
M. A. LEONARD.